United States Patent
Jung et al.

(10) Patent No.: US 8,106,364 B2
(45) Date of Patent: Jan. 31, 2012

(54) X-RAY DETECTING PANEL, X-RAY DETECTOR AND METHOD OF DRIVING THE X-RAY DETECTOR

(75) Inventors: Kwan-Wook Jung, Suwon-si (KR); Dae-Ho Choo, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 744 days.

(21) Appl. No.: 12/188,512

(22) Filed: Aug. 8, 2008

(65) Prior Publication Data

US 2009/0108209 A1 Apr. 30, 2009

(30) Foreign Application Priority Data

Oct. 31, 2007 (KR) .................. 10-2007-0110545

(51) Int. Cl.
*G01T 1/20* (2006.01)
*G01T 1/164* (2006.01)
(52) U.S. Cl. ......... 250/370.11; 250/208.1; 257/E51.005
(58) Field of Classification Search ............. 250/370.08, 250/370.11, 208.1, 363.02; 378/98.8; 257/E27.151, 257/E51.005
See application file for complete search history.

(56) References Cited

U.S. PATENT DOCUMENTS

| 6,856,670 | B2 * | 2/2005 | Hoheisel ................. 378/98.8 |
| 6,904,126 | B2 * | 6/2005 | Endo ...................... 378/98.8 |
| 7,381,938 | B2 * | 6/2008 | Kobayashi et al. ........ 250/208.1 |
| 2004/0016886 | A1 * | 1/2004 | Ringermacher et al. .. 250/370.11 |
| 2007/0040099 | A1 * | 2/2007 | Yokoyama et al. ....... 250/208.1 |

FOREIGN PATENT DOCUMENTS

| JP | 06120474 | 4/1994 |
| JP | 2001186415 | 7/2001 |
| JP | 2004172950 | 6/2004 |
| KR | 1019990084630 | 12/1999 |
| KR | 1020060020941 | 3/2006 |
| KR | 1020060131265 | 12/2006 |

\* cited by examiner

*Primary Examiner* — David Porta
*Assistant Examiner* — Faye Boosalis
(74) *Attorney, Agent, or Firm* — Cantor Colburn LLP (57) ABSTRACT

An X-ray detecting panel includes a thin film transistor; first and second photosensors connected to the thin film transistor; and a scintillator which changes X-rays that are external and incident thereto into visible light rays.

16 Claims, 4 Drawing Sheets

X-RAY DETECTING PANEL, X-RAY DETECTOR AND METHOD OF DRIVING THE X-RAY DETECTOR

This application claims priority to Korean Patent Application No. 10-2007-0110545, filed on Oct. 31, 2007, and all the benefits accruing therefrom under 35 U.S.C. §119, the contents of which in its entirety are herein incorporated by reference.

BACKGROUND OF THE INVENTION (a) Field of the Invention

The present invention relates to an X-ray detecting panel, an X-ray detector and method of driving the X-ray detector.

(b) Description of the Related Art

Recently, radiation transmission photo devices for the medical industry have received greater attention as these devices have been spotlighted for value-added business.

In the related art, a method of detecting X-rays uses an additional film. In this case, the film is only used when X-rays are irradiated to photograph a subject that does not move, and a new film must be used after X-rays are detected. Therefore, there is a drawback of an incremental increase of the cost for the additional film.

In addition, there is a method of detecting X-rays using a charge-coupled device ("CCD") or complementary metal-oxide semiconductor ("CMOS"). However, because a detector that is manufactured for CCD or CMOS is small, there is a drawback in that the image size is diminished and the images must be enlarged after detecting X-rays.

BRIEF SUMMARY OF THE INVENTION

Aspects of the present invention provide an X-ray detecting panel, an X-ray detector and method of driving the X-ray detector to detect irradiation of X-rays for a moving subject, to use semi-permanently without an additional cost, and in which it is not necessary to enlarge recorded images.

To obtain these aspects in an exemplary embodiment of the present invention, two photosensors (a PIN diode is used in the present exemplary embodiment) are connected to a thin film transistor in a detecting unit region of an X-ray detecting panel. Only one photosensor of the two photosensors is operated when a moving subject is detected, and two photosensors are operated when a stationary subject is detected.

An X-ray detecting panel according to an exemplary embodiment of the present invention includes a thin film transistor, first and second photosensors connected to the thin film transistor, and a scintillator which changes X-rays which are external and incident thereto into visible light rays.

The first and second photosensors may be each a PIN diode.

The thin film transistor may be connected to a gate line and a data line.

The first and second photosensors may be connected to first and second bias lines, respectively.

The gate line may be extended in a first direction, and the data line and the first and second bias lines may be extended in a second direction substantially perpendicular to the first direction.

An X-ray detecting panel according to an exemplary embodiment of the present invention includes: a substrate; a gate line disposed on the substrate and including a gate electrode; a gate insulating layer covering the gate line; a semiconductor disposed on the gate insulating layer and disposed on the gate electrode; a data line crossing the gate line, and including a source electrode covering a portion of the semiconductor; a lower electrode including a drain electrode facing the source electrode and extended from the drain electrode; a diode semiconductor disposed on the lower electrode; first and second upper electrodes disposed on the diode semiconductor, including a transparent conductive material, and separated from each other; a passivation layer covering the upper electrode, having first and second contact holes exposing the first and second upper electrodes, respectively; first and second bias lines electrically connected to the first and second upper electrodes through the first and second contact holes, respectively; and a scintillator disposed on the first and second bias lines, the scintillator changes X-rays which are external and incident thereto into visible light rays.

One of the first or second bias lines may cover the semiconductor layer disposed on the gate electrode.

The first and second photosensors may be each a PIN diode.

An X-ray detector according to an exemplary embodiment of the present invention includes: a detecting unit region including a thin film transistor, first and second photosensors connected to the thin film transistor, and a scintillator which changes X-rays external and incident thereto into visible light rays; a gate line and a data line connected to the thin film transistor; first and second bias lines connected to the first and second photosensors, respectively; a gate driver connected to the gate line; a receiving signal detector connected to the data line; and a bias power supplier connected to the first and second bias lines.

The receiving signal detector may include an OP amplifier, and a capacitor, a shift register, and an AD converter all connected to the OP amplifier.

The bias power supplier may include an apparatus for supplying and blocking a bias voltage applied to the first bias line and the second bias line.

A driving method of an X-ray detector according to an exemplary embodiment of the present invention, wherein the X-ray detector includes: a detecting unit region including a thin film transistor, first and second photosensors connected to the thin film transistor, and a scintillator which changes X-rays external and incident thereto into visible light rays; a gate line and a data line of a plurality of gate and data lines, respectively, connected to the thin film transistor; first and second bias lines connected to the first and second photosensors, respectively; a gate driver connected to the gate line; a receiving signal detector connected to the data line; and a bias power supplier connected to the first and second bias lines, wherein the driving method includes applying a bias voltage to the first and second bias lines when detecting a stationary subject and applying a bias voltage to one of the first or the second bias lines when detecting a moving subject, applying a gate-on voltage to one of the gate lines from the gate driver, and receiving the detected signal from the first and second photosensors in the receiving signal detector.

The receiving signal detector may include an OP amplifier, and a capacitor, a shift register, and an AD converter all connected to the OP amplifier.

The detecting of the detected signal in the receiving signal detector may include storing the detected signal from the first and second photosensors to the capacitor, transmitting the detected signal stored to the capacitor to the shift register when applying the gate-on voltage to a next gate line, and transmitting the detected signal applied to the shift register to the AD converter to convert the detected signal into a digital signal when applying the gate-on voltage to another gate line of the plurality of gate lines.

The method may further comprise detecting X-rays of four neighboring detecting unit regions as one detecting unit region.

In the X-ray detector according to an exemplary embodiment of the present invention, the thin film transistor in the detecting unit region of the X-ray detecting panel is connected to two photosensors, wherein only one photosensor is operated when detecting a moving subject, and two photosensors are operated when detecting a stationary subject.

As a result, a moving subject may be detected through the exposing of X-rays, it is not necessary to expand the images after detecting X-rays by compressing the subject region, and the X-ray detector may be semi-permanent without the use of additional films.

Description of Reference Numerals Indicating Referenced Elements in the Drawings

| | |
|---|---|
| 110: lower substrate | 121: gate line |
| 124: gate electrode | 154: semiconductor |
| 163, 165: ohmic contact layer | 171: data line |
| 173: source electrode | 175: drain electrode |
| 177: diode lower electrode | 180: passivation layer |
| 181, 182: contact hole | 191, 192: diode upper electrode |
| 198, 199: bias line | 210: upper substrate |
| 230: scintillator | |
| 251, 252, 253: diode semiconductor | |
| 300: X-ray detecting panel | 400: gate driver |
| 500: receiving signal detector | 600: bias power supplier |

DETAILED DESCRIPTION OF THE INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clarify multiple layers and regions, the thicknesses of the layers are enlarged in the drawings, and like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

First, an X-ray detector according to an exemplary embodiment of the present invention will be described in further detail with the reference to FIGS. 1 and 2.

Figure 1:
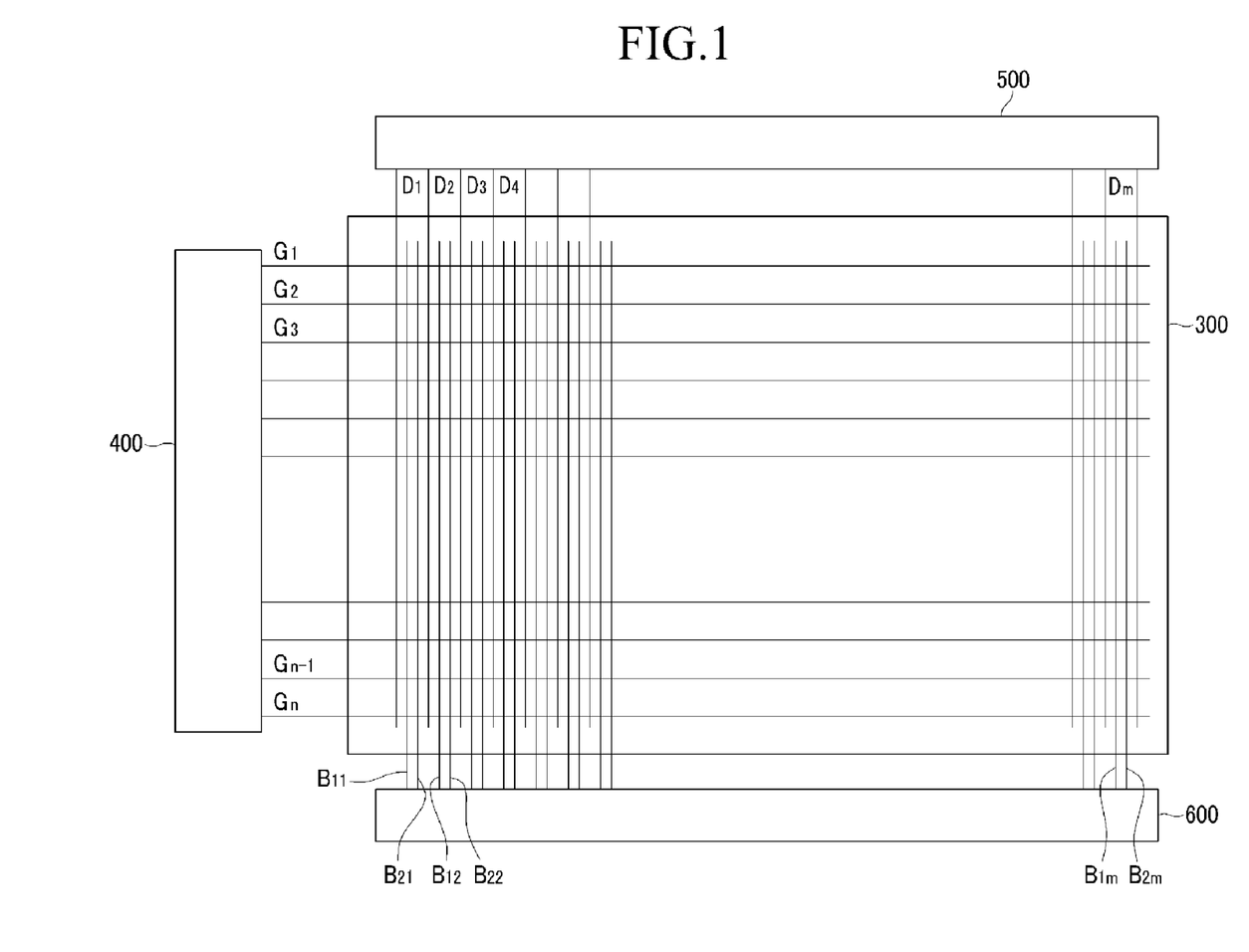
FIG. 1 is a schematic plan view of an X-ray detector according to an exemplary embodiment of the present invention.
Figure 2:
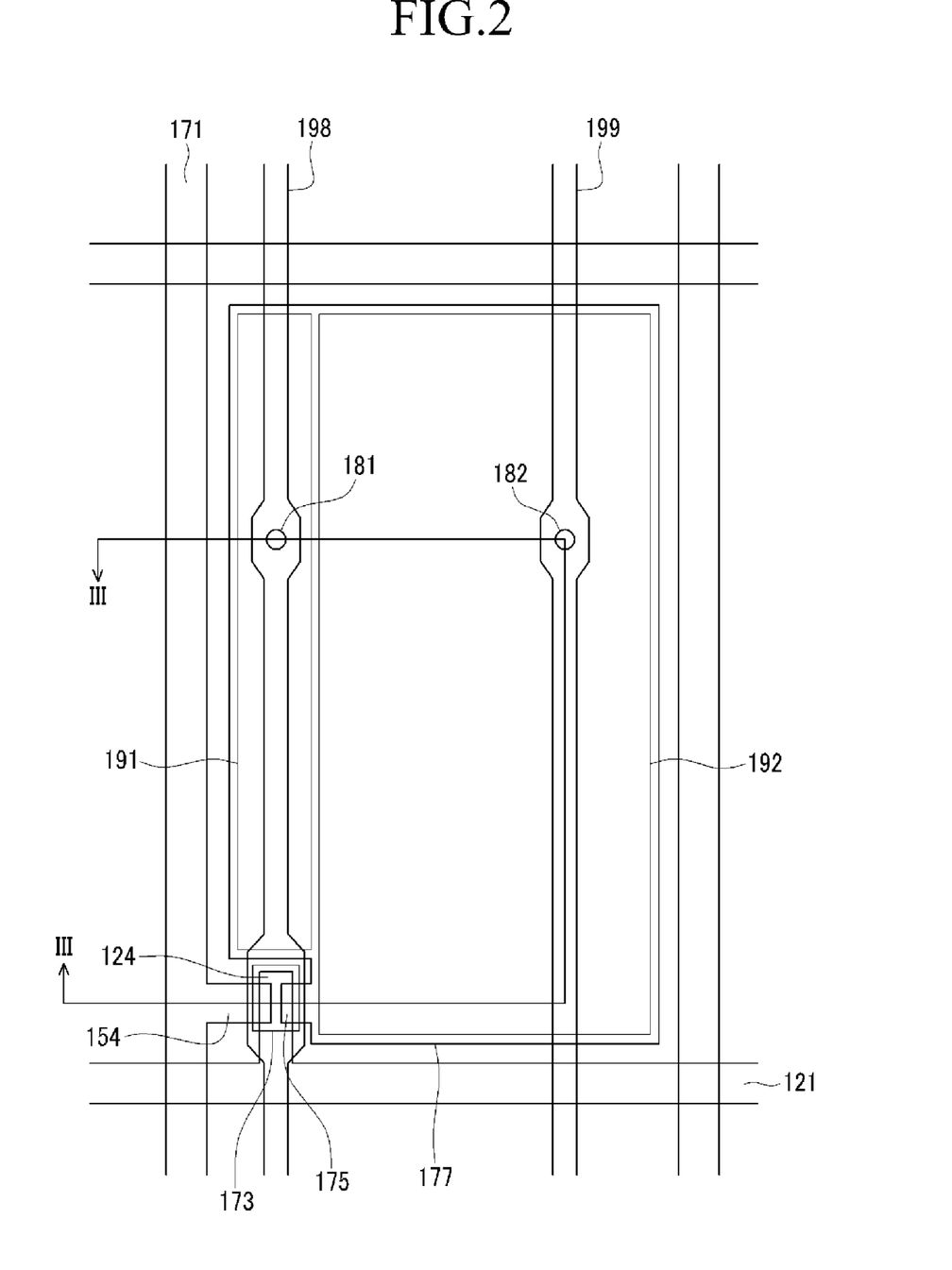
FIG. 2 is an enlarged plan view showing a single detecting unit region of the X-ray detector of FIG. 1 according to an exemplary embodiment of the present invention.

FIG. 1 is a schematic plan view of an X-ray detector according to an exemplary embodiment of the present invention, and FIG. 2 is an enlarged plan view showing a single detecting unit region of the X-ray detector of FIG. 1 according to an exemplary embodiment of the present invention.

As shown in FIG. 1, an X-ray detector according to an exemplary embodiment of the present invention includes an X-ray detecting panel 300, a gate driver 400 connected thereto, a receiving signal detector 500 and a bias power supplier 600.

Referring to FIG. 1 and FIG. 2, the X-ray detecting panel 300 includes a plurality of signal lines G1-Gn, D1-Dm, B11-B1m, and B21-B2m, and a plurality of detecting unit regions connected thereto and arranged in a matrix shape. Each detecting unit region includes one thin film transistor and two positive intrinsic negative ("PIN") diodes (e.g., photosensors) (refer to FIGS. 3 and 4). The PIN diodes have a function of sensing light. Further, a scintillator 230 (FIG. 3) is disposed on the thin film transistor and the PIN diodes. Because the scintillator 230 is made of a material that emits light when colliding with irradiation, (e.g., when X-rays are incident thereto), the scintillator 230 changes X-rays into visable light (e.g., emits visible light rays in a visible ray region of the light spectrum). The emitted visible light ray is detected through the PIN diode, which is a photosensor.

The signal lines (G1-Gn, D1-Dm, B11-B1m, and B21-B2m) include a plurality of gate lines G1-Gn that transmit gate signals (also referred to as "scanning signals"), a plurality of data lines D1-Dm that transmit the signals detected from the PIN diode to the receiving signal detector 500, and a plurality of bias lines B11-B1m and B21-B2m for applying a bias voltage to each PIN diode. The gate lines G1-Gn extend substantially in a row direction and are parallel with one another, and the data lines D1-Dm and the bias lines B11-B1m and B21-B2m extend substantially in a column direction and are parallel with one another.

The gate driver 400 is connected to the gate lines G1-Gn of the X-ray detecting panel 300 and synthesizes a gate-on voltage Von and a gate-off voltage Voff to generate gate signals, which are applied to the gate lines G1-Gn. The gate driver 400 sequentially applies the gate-on voltage Von to the gate lines G1-Gn one by one, and the gate-off voltage Voff is applied during the time that the gate-on voltage Von is not applied.

The receiving signal detector 500 is connected to the data lines D1-Dm of the X-ray detecting panel 300, and receives the signals detected from the PIN diode. The receiving signal detector 500 gathers the signals detected from the PIN diode in the capacitor (not shown) connected to an OP amplifier (not shown) during the gate-on time, transmits the signals to a shift register (not shown) to store them during at least one gate-on time, transmits the stored signals to an AD converter (not shown) such that the detected signals are changed into digital signals, and the digital signals are output.

The bias power supplier 600 is connected to the first bias lines B11-B1m and the second bias lines B21-B2m of the X-ray detecting panel 300, and applies the bias voltage to the PIN diode. Two PIN diodes are disposed in one detecting unit region such that two bias lines for applying the bias voltage to respective PIN diodes are formed. The bias power supplier 600 has a structure for controlling application of the bias voltage to the two bias lines. Here, the PIN diode that is applied with the bias voltage may detect X-rays and generate a current (specifically, X-rays are changed into visible light rays in the scintillator 230), and even though the visible light rays are incident to the PIN diode in a case in which the bias voltage is not applied, the current is not generated such that the PIN diode does not execute functioning as a sensor. When a stationary subject is exposed to X-rays, two bias lines are applied with the bias voltage to detect the X-rays. However, when a moving subject is exposed to X-rays, one of the two bias lines is not applied with the bias voltage. This is because driving the apparatuses 400, 500 and 600 at least 30 frames per second is required to detect a moving subject, but if the bias voltage is applied to two diodes, the RC delay of the diode itself is increased such that it is difficult to drive the TFT at 30 frames per second. This will be described in further detail below.

Each of the driving apparatuses 400, 500 and 600 may be integrated on and mounted in the X-ray detecting panel 300 as at least one integrated circuit ("IC") chip, may be mounted on a flexible printed circuit film (not shown) and then be adhered to the X-ray detecting panel 300 in a tape carrier package ("TCP") form, or may be mounted in a printed circuit board ("PCB") (not shown). Alternatively, the driving apparatuses 400, 500 and 600 may be integrated with the liquid crystal panel assembly 300 along with the signal lines G1-Gn, D1-Dm, B11-B1m, and B21-B2m, the thin film transistor switching element Qs (see FIG. 4), for example, but is not limited thereto.

In addition, the driving apparatuses 400, 500 and 600 may be integrated into a single IC chip. In this case, at least one of the driving apparatuses 400, 500 and 600 or at least one circuit device forming the driving apparatuses 400, 500 and 600 may be disposed outside the single chip.

Figure 4:
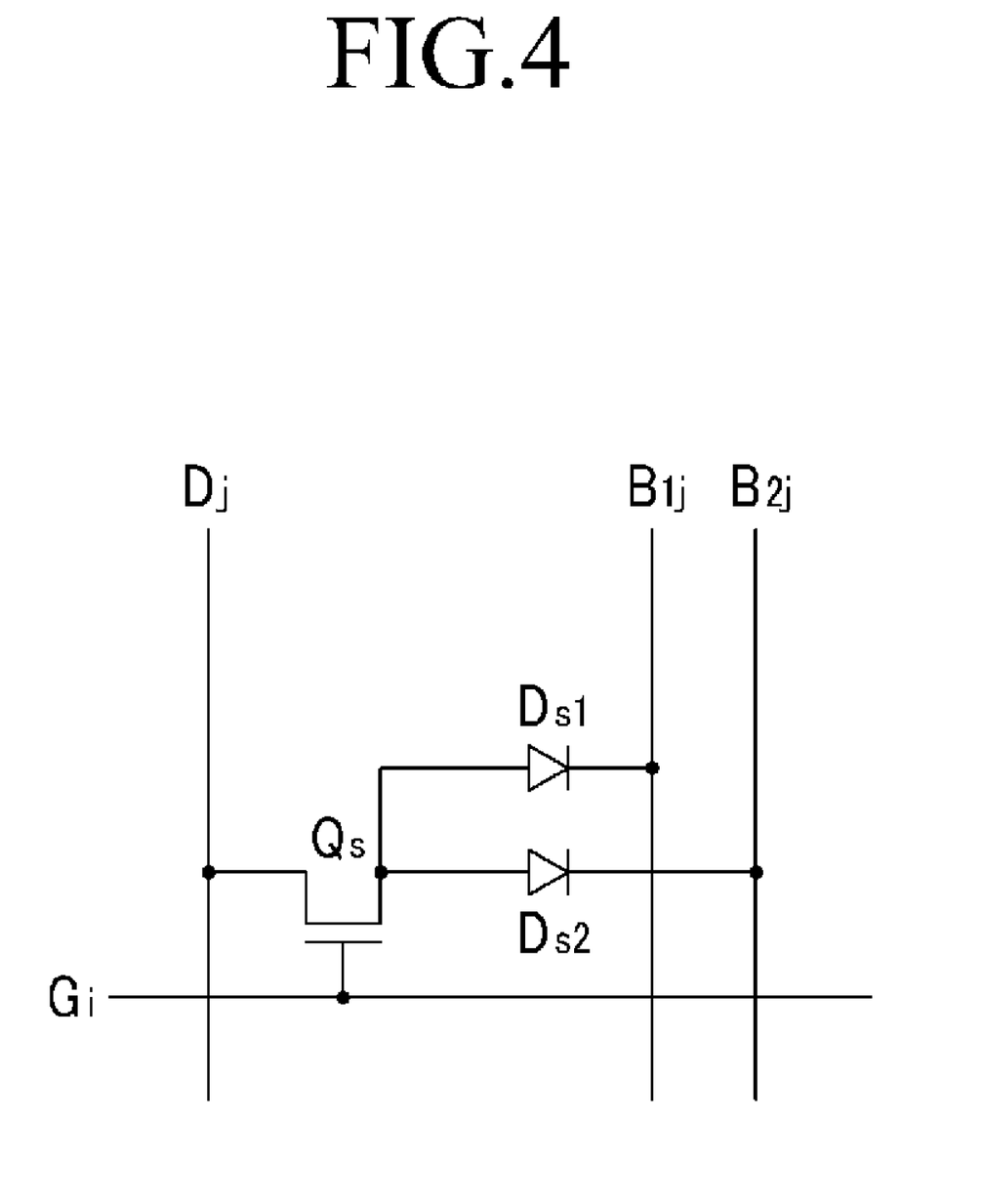
FIG. 4 is an equivalent circuit diagram of the single detecting unit region of the X-ray detector according to an exemplary embodiment of the present invention.

FIG. 4 is an equivalent circuit diagram of one detecting unit region.

Each detecting unit region, for example the detecting unit region connected to the i-th (i=1, 2, ..., n) gate line G1 and the j-th (j=1, 2, ..., m) data line Dj, includes a switching element Qs connected to the signal lines Gi, Dj and two PIN diodes Ds1 and Ds2 connected to the switching element Qs.

The switching element Qs is provided in the lower substrate 110 (FIG. 3) as a three terminal element such as a thin film transistor, and includes a control terminal connected to the gate lines G1-Gn, an output terminal connected to the data lines D1-Dm, and an input terminal connected to the two PIN diodes Ds1 and Ds2.

The PIN diodes Ds1 and Ds2 each have a structure of a P-type semiconductor, an intrinsic semiconductor and an N-type semiconductor which are sequentially connected, and include the characteristic of flowing the currents in one direction when detecting the external light. The PIN diodes Ds1 and Ds2 receive a bias voltage through the bias lines B1j, B2j and transmit the output to the input terminal of the switching element Qs.

Next, the structure of one detecting unit region according to an exemplary embodiment of the present invention will be described in further detail.

Figure 3:
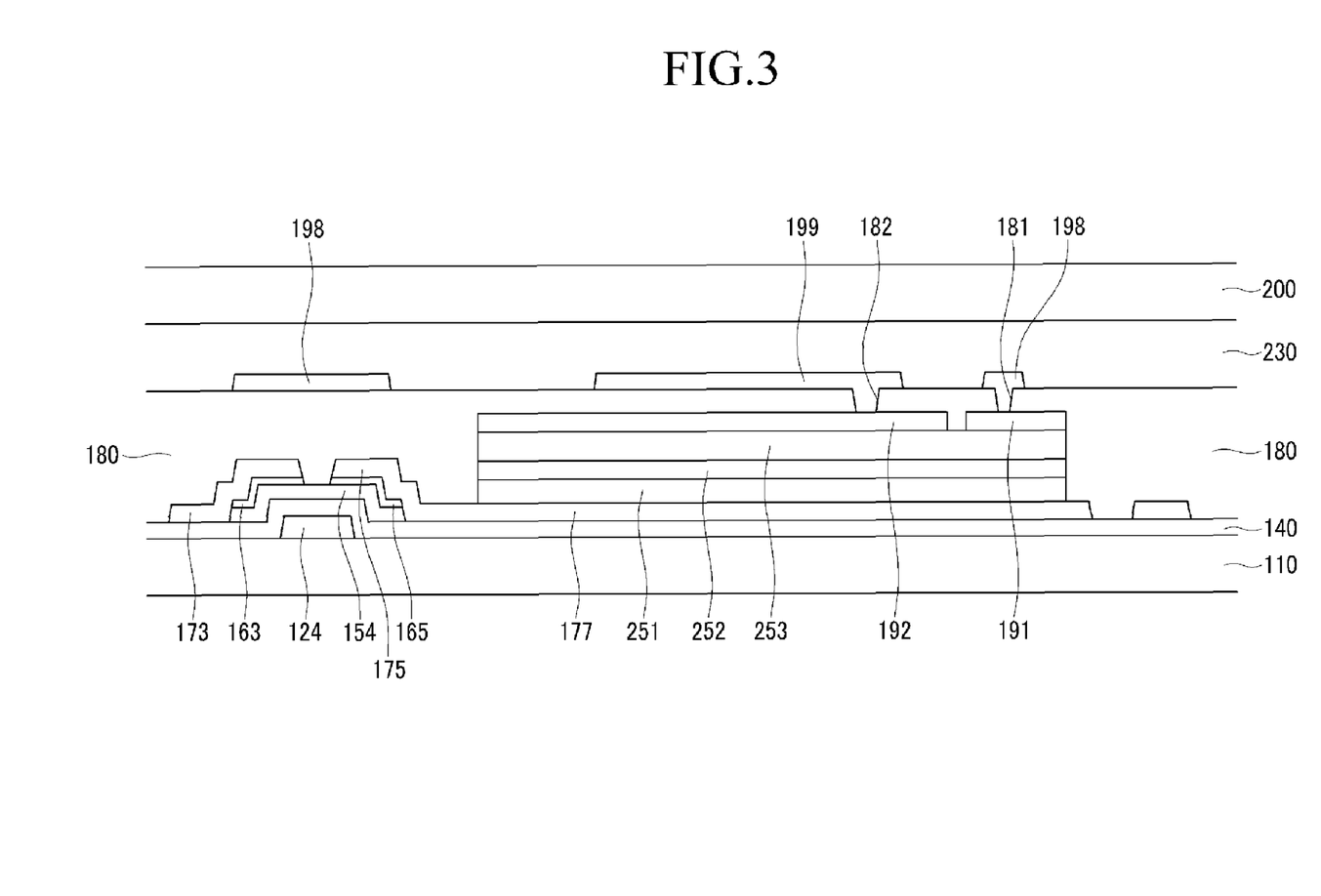
FIG. 3 is a cross section view showing the single detecting unit region along line III-III of FIG. 2 according to an exemplary embodiment of the present invention.

FIG. 2 is an enlarged plan view showing the single detecting unit region of the X-ray detector of FIG. 1 according to an exemplary embodiment of the present invention. FIG. 3 is a cross-sectional view of the X-ray detector taken along line III-III of FIG. 2.

The X-ray detecting panel 300 according to the present exemplary embodiment includes a lower substrate 110, an upper substrate 200 facing thereto, thin film transistors (only one shown) having gate, source and drain electrodes 124, 173 and 175, respectively, PIN diodes 177, 251, 252, 253, 191, and 192, and a scintillator 230 connected therebetween.

A plurality of gate lines 121 are formed on the lower substrate 110 made of transparent glass or plastic.

The gate lines 121 transmit gate signals and extend in the horizontal direction, as illustrated in FIG. 2. Each gate line 121 includes a plurality of gate electrodes 124 protruding upwardly from the lower substrate 110, as illustrated in FIG. 3.

A gate insulating layer 140 preferably made of silicon nitride ("SiNx") or silicon oxide ("SiOx") is formed on the gate lines 121.

A plurality of semiconductor islands 154 preferably made of hydrogenated amorphous silicon or polysilicon are formed on the gate insulating layer 140. The semiconductors 154 are disposed on the gate electrodes 124, and the semiconductors 154 have sufficient size in exemplary embodiments to cover the end portions of the gate electrodes 124, but is not limited thereto.

A plurality of ohmic contact islands 163 and 165 are formed on the semiconductors 154. The ohmic contacts 163 and 165 can be made of a material such as n+ hydrogenated amorphous silicon with an n-type impurity such as phosphor doped at a high concentration, or of silicide.

A plurality of data lines 171 and a plurality of drain electrodes 175 are formed on the ohmic contacts 163 and 165 and the gate insulating layer 140.

The data lines 171 transmit the signals detected from the PIN diodes, and extend in the vertical direction by crossing the gate lines 121, as illustrated in FIG. 2. Each data line 171 includes a plurality of source electrodes 173 connected thereto and each is extended toward a corresponding gate electrode 124.

Each drain electrode 175 is separated from the data line 171 and is opposite to the source electrode 173 with respect to the corresponding gate electrode 124. Each drain electrode 175 is extended to cover most of the detecting unit region (e.g., a region separated from the thin film transistor region, the gate line 121 and the data line 171 by a determined distance). This region extended from the drain electrode 175 forms a lower electrode 177 of the PIN diode.

The gate electrode 124, the source electrode 173 and the drain electrode 175 along with the semiconductor island 154 form the thin film transistor TFT having a channel formed in the semiconductor island 154 disposed between the source electrode 173 and the drain electrode 175.

The ohmic contacts 163 and 165 are interposed only between the underlying semiconductors 154, and the overlying data lines 171 and the overlying drain electrodes 175 thereon, and thus reduce contact resistance therebetween.

Diode semiconductors 251, 252 and 253 are formed on the lower electrode 177 of the PIN diode. The diode semiconductors are an N-type semiconductor 251, an intrinsic semiconductor 252 and a P-type semiconductor 253, respectively, and they are sequentially disposed to form the PIN diode.

Upper electrodes 191 and 192 that are preferably made of a transparent conductive material such as ITO or IZO are formed on the P-type semiconductor 253. The upper electrodes 191 and 192 include two electrodes that are separated from each other. It is preferably that one electrode 192 of the two electrodes has a wide area and that the remaining electrode 191 has a small area. This is because the PIN diode having the upper electrode 191 with the small area can detect a moving subject more quickly than the PIN diode having the upper electrode 192 with the wide area for detection of an X-ray.

A passivation layer 180 is formed on the data lines 171, the drain electrodes 175, the exposed semiconductor 153, and the upper electrodes 191 and 192 of the PIN diode. The passivation layer 180 may be made of an inorganic insulator such as silicon nitride or silicon oxide, or an organic insulator. The passivation layer 180 may be made of a dual-layer structure of an inorganic insulator and an organic insulator. The passivation layer 180 has a plurality of first and second contact holes 181 and 182 respectively exposing the first upper electrode 191 and the second upper electrode 192.

A plurality of first and second bias lines 198 and 199 are formed on the passivation layer 180. The first bias lines 198 cover the first contact holes 181 and are extended in the vertical direction while intersecting the gate lines 121, and are parallel to the data lines 171, as illustrated in FIG. 2. The first bias lines 198 are electrically connected to the first upper electrodes 191 through the first contact holes 181. On the other hand, the first bias lines 198 cover the channel portions of the thin film transistors, and as a result function as a light blocking layer for blocking light that is incident to the exposed semiconductor 154.

Also, the second bias lines 199 cover the second contact holes 182 and are parallel to the first bias lines 198. The second bias lines 199 are electrically connected to the second upper electrodes 192 through the second contact holes 182.

The scintillator 230 is formed on the passivation layer 180 and on the first and second bias lines 198 and 199. The scintillator 230 is preferably made of a material that emits light when colliding with irradiation rays, and the emitted light is changed into visible light of the visible ray region (e.g., particularly a green wavelength) when X-rays are incident thereto. The visible light in turn is incident to the PIN diodes to generate a current.

An upper substrate 200 is formed on the scintillator 230.

The structures of the X-ray detector and one detecting unit region according to an exemplary embodiment of the present invention have been explained hereinabove.

Two PIN diodes are formed in one detecting unit region. When detecting a stationary subject using X-rays, two PIN diodes are used to detect the X-rays. In contrast, when detecting a moving subject using X-rays, only one of the two PIN diodes is used to detect X-rays.

The reason will be described hereinbelow.

In the case of a stationary subject, even if it takes a long time for an X-ray detector to detect X-rays, this is not a problem. However, driving the driving apparatuses 400, 500 and 600 at least 30 frames per second is required to detect a moving subject (for example the flowing of blood or a heartbeat). That is, the time for detecting all X-rays in the detecting region of one frame must take less than $\frac{1}{30}$ second (about 0.033 seconds).

However, the required time for detecting X-rays and transmitting them from the PIN diode to the receiving signal detector 500 for the detecting region of one frame is actually about 0.358 seconds in an X-ray detector having a resolution of 2000×2000. In addition, a time of 0.1 seconds is additionally required to convert into digital signals through an AD converter (not shown) in the receiving signal detector 500. As a result, it is impossible to detect a moving subject at 30 frames per second based on the above time requirements for transmission and conversion of the signal.

Actually, most of the 0.358 seconds is taken by RC delay generated in one detecting unit region. Here, R is resistance when the TFT is turned on, and C is capacitance of the PIN diode. Because R is a characteristic of the TFT, it is maintained as it is, but C may be controlled by increasing or decreasing the area A occupied by the PIN diode or the thickness d of the PIN diode (referring to Equation 1 below). Specifically, because the thickness of the PIN diode is generally fixed, it is preferable to reduce the area A.

$$C = \varepsilon \frac{A}{d} \qquad \text{(Equation 1)}$$

As a result, according to an exemplary embodiment of the present invention, two diodes are formed, and when detecting a moving subject by using X-rays, if only one PIN diode is used, C is decreased to thereby reduce the time required for detecting X-rays.

On the other hand, even if C is decreased, when the required detecting time is not smaller than $\frac{1}{30}$ second, or if high resolution is required and a time of more than 30 frames per second is required, the methods that will be described hereinbelow may be also used (e.g., in addition) to reduce the detection time. One or more of the methods that will be described below may be used.

First, four neighboring detecting unit regions may be driven as one. The four neighboring detecting unit regions include a first detecting unit region of the upper side and the lower side and the second detecting unit region of the right side and the left side with reference to one detecting unit region, and the third detecting unit region neighboring the first and second detecting unit regions. When using this method, the resolution may be decreased, but the detecting time of an X-ray detector is reduced by half.

Second, capacitors, shift registers and AD converters which are connected to an OP amplifier gather the charges in the receiving signal detector 500 and output the data in synchronization with a period in which one gate line is turned on. That is, if a signal which is output from the PIN diode is stored to the capacitor, the next gate line is turned on. Here, the capacitor transmits the stored data to the shift register. If the next gate line is turned on, the data stored to the shift register is transmitted to the AD converter and is output as digital signals. In this method, the AD converting is completed during the time of the detecting signal output of the PIN diode to include the time of the AD converting to the time of the detecting signal output of the PIN diode to reduce the entire driving time (the opposite case may also be possible). That is, when the resolution is high, the time of the AD converting may be longer than the time of the detecting signal output of the PIN diode.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. An X-ray detecting panel comprising:
   a thin film transistor;
   first and second photosensors directly connected to the thin film transistor; and
   a scintillator which changes X-rays that are external and incident thereto into visible light rays.

2. The X-ray detecting panel of claim 1, wherein the first and second photosensors are each a PIN diode.

3. The X-ray detecting panel of claim 1, wherein the thin film transistor is connected to a gate line and a data line.

4. The X-ray detecting panel of claim 3, wherein the first and second photosensors are connected to a first bias line and a second bias line, respectively.

5. The X-ray detecting panel of claim 4, wherein the gate line is extended in a first direction, and the data line and the first and second bias lines are extended in a second direction substantially perpendicular to the first direction.

6. The X-ray detecting panel of claim 1, wherein the thin film transistor is a single thin film transistor connected to the first and second photosensors defining a detecting unit region.

7. An X-ray detecting panel comprising:
   a substrate;
   a gate line disposed on the substrate and including a gate electrode;
   a gate insulating layer covering the gate line;
   a semiconductor disposed on the gate insulating layer and disposed on the gate electrode;
   a data line crossing the gate line, and including a source electrode covering a portion of the semiconductor;
   a lower electrode including a drain electrode facing the source electrode and extended from the drain electrode;
   a diode semiconductor disposed on the lower electrode;
   first and second upper electrodes disposed on the diode semiconductor, including a transparent conductive material, and separated from each other, the first and second upper electrodes defining first and second photosensors, respectively, the first and second photosensors directly connected to the drain electrode;
   a passivation layer covering the upper electrode, the passivation layer having first and second contact holes exposing the first and second upper electrodes, respectively;
   first and second bias lines electrically connected to the first and second upper electrodes through the first and second contact holes, respectively; and
   a scintillator disposed on the first and second bias lines, the scintillator changes X-rays external and incident thereto into visible light rays.

8. The X-ray detecting panel of claim 7, wherein one of the first and second bias lines cover the semiconductor layer disposed on the gate electrode.

9. The X-ray detecting panel of claim 8, wherein the first and second photosensors are each a PIN diode.

10. The X-ray detecting panel of claim 7, wherein the drain electrode is a single drain electrode of a single thin film transistor connected to the first and second photosensors defining a detecting unit region.

11. An X-ray detector comprising:
    a detecting unit region including a thin film transistor, first and second photosensors directly connected to the thin film transistor, and a scintillator which changes X-rays external and incident thereto into visible light rays;
    a gate line and a data line connected to the thin film transistor;
    first and second bias lines connected to the first and second photosensors, respectively;
    a gate driver connected to the gate line;
    a receiving signal detector connected to the data line; and
    a bias power supplier connected to the first and second bias lines.

12. The X-ray detector of claim 11, wherein the bias power supplier includes an apparatus for supplying and blocking a bias voltage applied to the first bias line and the second bias line.

13. The X-ray detector of claim 11, wherein the thin film transistor is a single thin film transistor connected to the first and second photosensors defining the detecting unit region.

14. A driving method of an X-ray detector which comprises: a detecting unit region including a thin film transistor, first and second photosensors directly connected to the thin film transistor, and a scintillator which changes X-rays external and incident thereto into visible light rays;
    a gate line and a data line of a plurality of gate lines and data lines, respectively, connected to the thin film transistor;
    first and second bias lines connected to the first and second photosensors, respectively;
    a gate driver connected to the gate line;
    a receiving signal detector connected to the data line; and
    a bias power supplier connected to the first and second bias lines,
    wherein the driving method comprises:
    applying a bias voltage to the first and second bias lines when detecting a stationary subject and applying a bias voltage to one of the first and the second bias lines when detecting a moving subject;
    applying a gate-on voltage to one of the gate lines from the gate driver; and receiving a detected signal from the first and second photosensors in the receiving signal detector.

15. The method of claim 14, further comprising detecting X-rays of four neighboring detecting unit regions as one detecting unit region.

16. The method of claim 14, wherein the thin film transistor is a single thin film transistor connected to the first and second photosensors defining the detecting unit region.

* * * * *